United States Patent
Cline et al.

(10) Patent No.: US 8,221,619 B2
(45) Date of Patent: Jul. 17, 2012

(54) ONE PIECE COMBINATION ANTI-DRAIN BACK AND RELIEF VALVE

(75) Inventors: L. Steven Cline, Fayetteville, NC (US); Travis Canup, Fayetteville, NC (US); Rajan Ahuja, Fayetteville, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 455 days.

(21) Appl. No.: 12/352,982

(22) Filed: Jan. 13, 2009

(65) Prior Publication Data

US 2009/0178964 A1     Jul. 16, 2009

Related U.S. Application Data

(60) Provisional application No. 61/020,924, filed on Jan. 14, 2008.

(51) Int. Cl.
B01D 27/10 (2006.01)
(52) U.S. Cl. .............. 210/130; 210/136; 137/512.15
(58) Field of Classification Search .............. 210/130, 210/136; 137/512.15
See application file for complete search history.

(56) References Cited

U.S. PATENT DOCUMENTS

| | | | |
|---|---|---|---|
| 3,339,738 A | 9/1967 | Wilhelm | |
| 3,567,023 A * | 3/1971 | Buckman et al. | 210/130 |
| 3,785,491 A | 1/1974 | Dudinec et al. | |
| 4,144,168 A | 3/1979 | Thornton | |
| 5,284,579 A | 2/1994 | Covington | |
| 5,833,843 A | 11/1998 | Covington | |
| 6,136,183 A | 10/2000 | Suzuki et al. | |
| 6,790,356 B2 | 9/2004 | Wright et al. | |
| 6,793,808 B2 | 9/2004 | McKenzie | |
| 6,926,156 B2 | 8/2005 | Wall | |
| 6,936,161 B2 | 8/2005 | Wright et al. | |
| 7,160,447 B2 | 1/2007 | Yates | |
| 7,168,572 B2 | 1/2007 | Nguyen et al. | |
| 2005/0242012 A1 | 11/2005 | Cline | |
| 2007/0080105 A1 | 4/2007 | Attassery | |
| 2007/0163931 A1 | 7/2007 | Cline | |

OTHER PUBLICATIONS

Corresponding search report dated Mar. 23, 2009.
Corresponding Japanese office action dated Mar. 23, 2009.

* cited by examiner

*Primary Examiner* — Terry Cecil
(74) *Attorney, Agent, or Firm* — Crowell & Moring LLP

(57) ABSTRACT

A fluid filter and an end cap of the fluid filter are described. The filter may be a spin on oil filter, which includes a combination dual valve element defining an integral anti-drain back valve and an integral relief valve, a retainer assembly for maintaining the combination dual valve element in position in the end cap, relative to the filter. The combination dual valve element includes an ADB sealing lip forming an anti-drain back valve portion, and an RV sealing lip forming a relief valve portion.

17 Claims, 6 Drawing Sheets

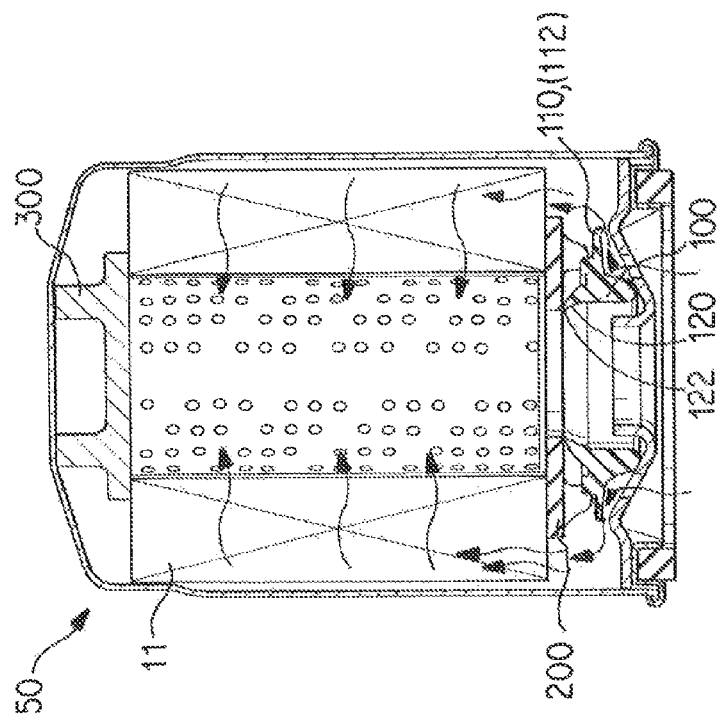
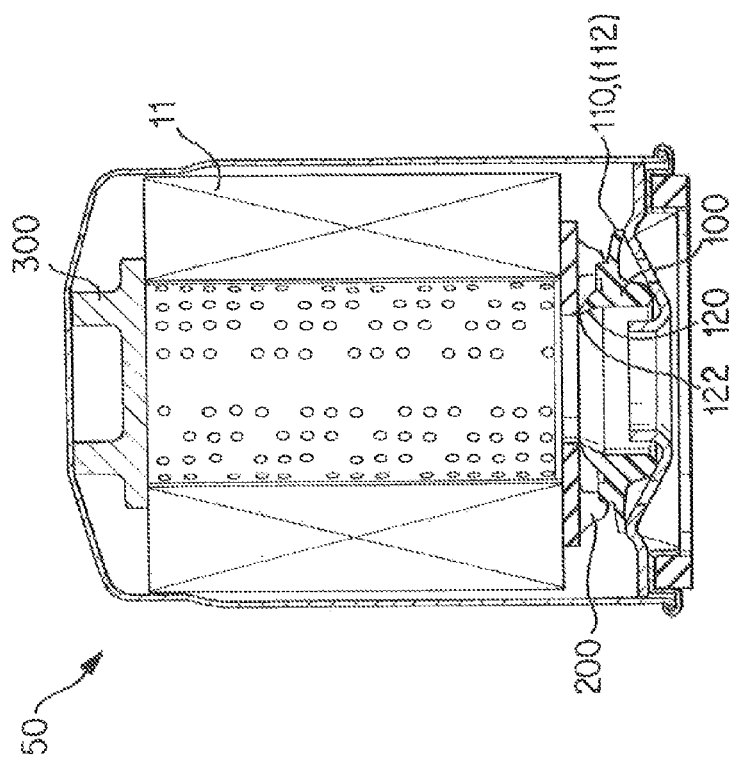

ONE PIECE COMBINATION ANTI-DRAIN BACK AND RELIEF VALVE

CROSS REFERENCE TO RELATED APPLICATIONS

The application is related to U.S. patent application Ser. Nos. 12/038,481, 12/038,498, 61/020,922 and 61/020,919, the contents of which are incorporated herein by reference in their entirety. The present application claims the benefit of the priority date under Jan. 14, 2008 based on the provisional application Ser. No. 61/020,924.

BACKGROUND AND SUMMARY OF THE INVENTION

The invention is related to a fluid filter having a filter element sealed inside a canister, also called a spin-on type fluid filter. These filters are used in automotive or stationary internal combustion engines that require uninterrupted oil lubrication for moving parts, with continually filtered oil supplied through such a fluid filter in a lubrication circuit.

The available conventional designs of typical spin-on or canister sealed fluid filters include a set of components made both of metallic and/or non-metallic materials, that support the main filtration function of the filter element housed inside the can. A typical conventional fluid filter assembly is shown in FIG. 5, depicting the many multiple components and parts that are used. Many of these components and the processes necessary to assemble them are non-value adding, in that they are not directly related to performing the filtering function. These extraneous non-value adding components and processes are in large part eliminated in the embodiments according to the present invention.

Filter element 11, shown in FIG. 5, has the main function of fluid filtration. It is housed in a can 12 and seamed with the threaded plate and retainer assembly 13 to provide for a mounting arrangement usable for being attached to the mounting base of an engine (not shown). The thread plate assembly 13 has inlet holes 14 used to feed the unfiltered or dirty oil to the filter housing, using passages formed around the central thread hole 15. The central thread hole 15 in turn forms an outlet for the clean oil from the spin-on can filter.

When the engine is started, oil flows to the filter housing through the inlet holes 14, at the design pressure and flow delivered by an oil pump (not shown). The filter is mounted on a threaded stud (not shown) of the engine corresponding to the threaded hole 15, with a piped pathway to return the filtered oil from the inner core of the filter element back to the engine's moving and/or stationary parts that need continuous lubrication under varied operating conditions.

An anti-drain back valve 16 with a cup shaped rubber cone 17 covering the inlet holes 14 of the thread plate helps to retain the fluid (for example lubricating oil) in the housing/can 12 when the engine is turned off. This requirement may be important when the filter is mounted with the case dome up and the threaded plate downwards, or when the filter is oriented in any horizontal mounting. The rubber conical flap 17 unseats from the inlet holes 14 under the force of the pressurized supply of fluid when the engine starts, and allows for inflow of fluid in the filter housing.

When the pump or the engine are off, the conical round flap of the anti-drain back valve seats back on circumferential seat 18 on the metal threaded plate 13, to prevent the flow back from the inlet holes and thus retaining the oil/fluid in the filter housing. This arrangement helps preventing the filter from becoming dry, and prevents air from being trapped in the oil system. Thus, as the engine is started, the oil flow occurs immediately without any air pockets forming in the lubrication circuit.

In conventional filter designs in current production, a filter media element 11 may include a bottom spring support or element guide 19 for filter element 11, to provide sealing between the inlet and the outlet, and for cushioning the design stack-up tolerances of the multiple assembly components involved, by using a compression spring or element guide type supports. The end sealing cap (made of plastic or metal) 20 is used to seal the filter media 11. End cap 20 provides a seat for a relief and bypass valve, which is assembled from a set of components such as a spiral or compression spring 21, a piston 22 and U-clamp or housing 23 that is welded or riveted to the end cap, to hold those components together.

Conventional end cap assemblies include several other components. The exemplary relief valves may be disposed on the thread side top end caps, on the inlet side of the filter, or on the bottom side caps of the filter elements. Such a relief valve is embodied in the filter element to provide the lubrication oil in the event of cold starting conditions, when the engine is turned on after a sufficient lapse of time, or when the filtration media becomes clogged with extensive usage or excessive dirt in the oil. A purpose of the relief valve or bypass valve is to open-up and connect the inlet to the outlet, so the fluid can pass without being filtered. This is done to prevent lubrication starvation when a restriction across the filter is increases to the point where if the relief valve or bypass valve does not open, little or no lubricant would reach the engine.

Some of the principal components used to assemble a filter and to achieve the filtration function are as follow, as shown in FIG. 5.

The external components include:
Filter housing 12.
Thread plate with retainer for assembly with case/can 13.
Seal gasket 10.
The internal components include:
Filter media element 11 with supporting center tube 09.
Anti-drain back valve (ADB) 16.
Relief valve (RV) 08.
Bottom support 19.

Additional supplementary elements and components that make-up the internal parts and assemblies of the filter are listed below. These parts are for the most part made superfluous according to the present invention, which is a one-piece combination anti-drain back and relief valve. The components and parts, as well as the processes that may be avoided according to the present invention include, for example:
Bottom spring/element guide 19,
Relief valve housing 23,
Relief valve spring 21,
Relief valve piston 22,
End cap bottom/top 20,
Welding or riveting process for relief valve assembly 31.
Adhesive bonding of metal or plastic cap to filter element and thermal curing process thereof 32.

According to embodiments of the invention, the additional components described above are replace by single-piece, resilient end elements of the filter, which combine the functions of the relief valve, of the anti-drain back valve and of various seals. Various manufacturing processes used conventionally to assemble the additional filter components are also avoided, further simplifying the construction.

As will be described in greater detail below, the specially shaped combination components formed from resilient materials, can be assembled using interference fit to retain the parts together, and to retain them in end caps of the filter can 12. For example, an exemplary end cap according to the invention may include an element that defines an end seal and a bottom support for the filter media. Another end cap may include the exemplary combination dual valve element that defines the anti-drain back valve, the relief valve, and an end seal. In addition, the second end cap may be adapted for attachment to an engine face.

Other objects, advantages and novel features of the present invention will become apparent from the following detailed description of the invention when considered in conjunction with the accompanying drawings.

BRIEF DESCRIPTION OF THE DRAWINGS

In the drawings:

FIG. 1 is a diagram showing an exemplary filter according to an embodiment of the invention in a no oil flow condition corresponding to an engine off/pump off condition, when both the relief valve and the anti-drain back valve of the combination dual valve element are closed;

FIG. 2 is a diagram showing the filter with the combination dual valve element of FIG. 1 in a normal oil flow condition corresponding to the engine/pump operating, when the relief valve is closed and the ADB valve is open;

DETAILED DESCRIPTION OF THE DRAWINGS

Figure 5A:
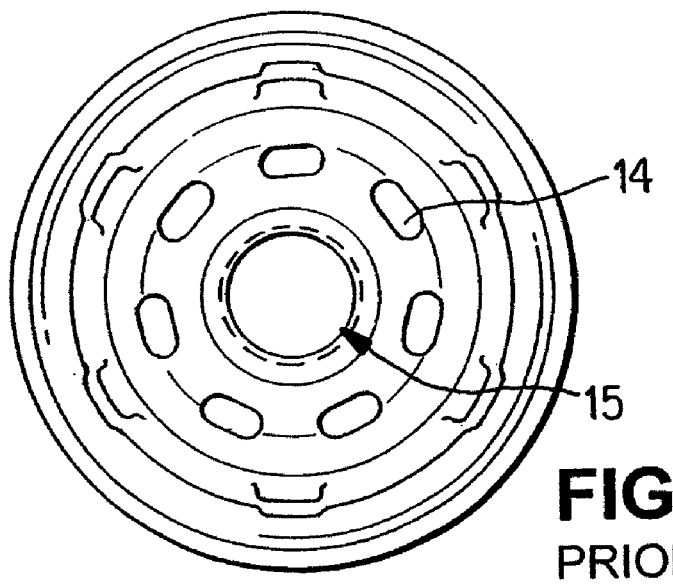
FIGS. 5 and 5a are diagrams showing the various components used in manufacturing a conventional designs spin-on fluid filter.
Figure 5:
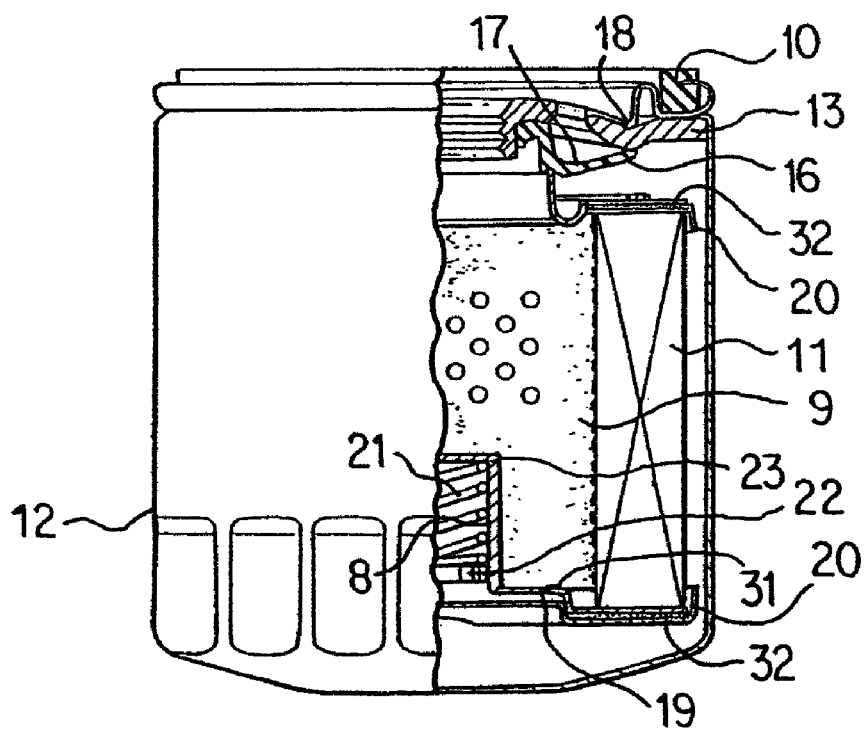
Figure 6:
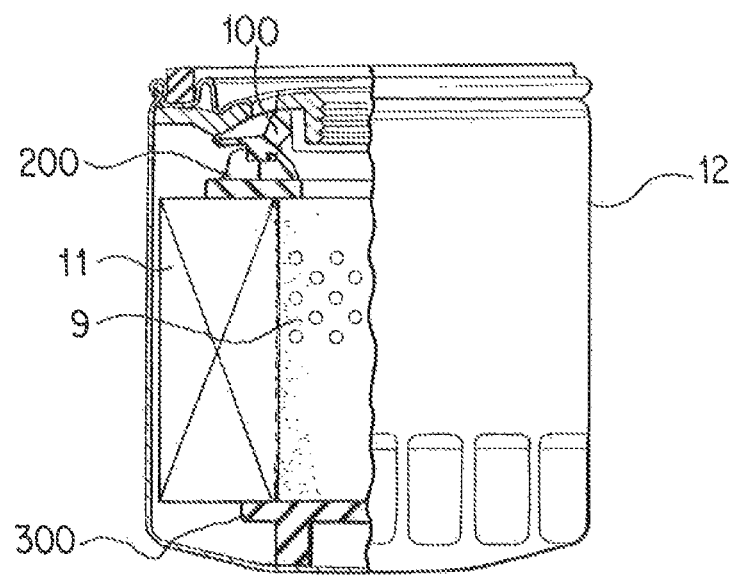
FIG. 6 is a diagram showing an exemplary embodiment of the spin-on fluid filter according to the invention, with a combination dual valve element integrating a relief valve with an anti-drain back valve with an end seal at one end, and having a bottom support end seal at another end.
Figure 7:
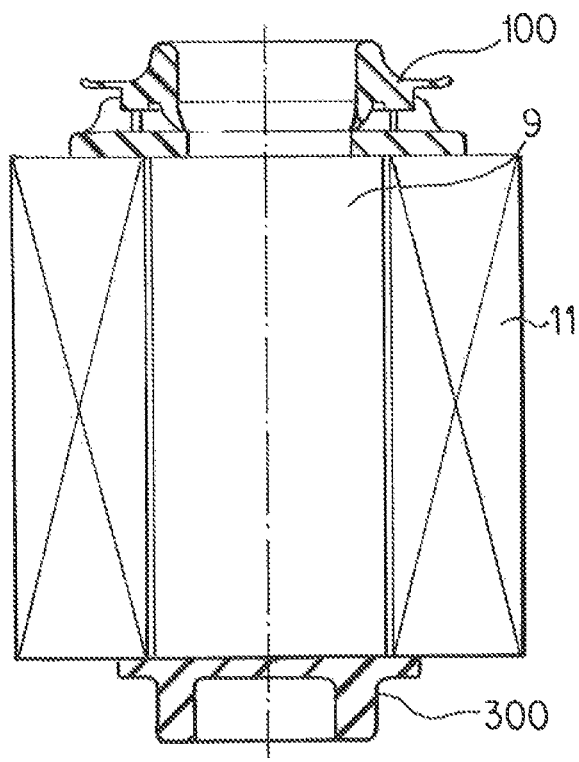
FIG. 7 is a diagram showing schematically a filter with the combination dual valve element disposed at a top end together with an end seal, and with an element support and seal element at a bottom end, according to an exemplary embodiment of the invention.

According to the exemplary embodiments of the invention, the one piece combination dual valve element 100 integrating an anti-drain back portion 110 and relief valve portion 120 as shown in FIGS. 8a-8d is described within the context of the filter assembly shown in FIG. 6. A comparison can made between the exemplary components of the present invention and a filter of conventional current design, shown in FIG. 5, to note the elimination all the non-value adding parts and processes and the simpler assembly of the exemplary filter.

According to the present invention, the fluid filter 50 replaces various components like the bottom support guide (spring), end cap, bonding plastisol/glue, with a molded bottom element support seal disposed at the bottom end of the filter media element. A similarly molded top element seal and combination dual valve element is provided, having flow slots designed to operate like a combination anti-drain back and relief value.

In one exemplary embodiment, both top and bottom end seal features are molded to the filter element from semi-resilient non metallic materials, such as polyurethane or nylon-based materials, plastisol, polyurethane or any other such compounds and materials having the desired properties. The combination dual valve element integrating the ADB and relief valve may be a one-piece molded part formed from nitrile, silicon or other similar rubber materials having resilience properties selected to achieve the opening and closing functions of the relief valve and of the anti-drain back valve.

The embodiments of the present invention provide a combination anti-drain back and relief valve that may be used together with a molded top seal and bottom seal parts to reduce components, parts and non-value adding processes in making a spin-on fluid filter. The exemplary combination dual valve element 100 includes a RV seal lip 122 that sits conically in a central hole 204 of the molded end seal 200. For example, the RV sealing lip 122 may be circular with dimensions substantially equal to those of the circular opening 204.

The combination dual valve element 100 also includes flow zones or openings 104 that are designed to be in proportional relationship with slots 202 formed in the end seal 200, for achieving the designed RV opening pressure of the ADB seal lip 112. The flow zones 104 may be formed between support lugs 102 of the combination dual valve element 100, that are adapted to absorb the stack-up tolerances of parts due to errors caused by cumulative manufacturing tolerances of the filter parts. The openings 202 of the end seal 200 may be formed between protrusions 206 designed to mate with the combination dual valve element 100. The support lugs 102 may extend from the combination dual valve element 100 the same length as the RV seal lip 122, or a different distance depending on the application.

While the combination dual valve element 100 is disposed in the molded end seal 200 with the exemplary slot opening features according to the invention, the proportioned related openings 202 establish constant opening zones for achieving the flow restriction characteristics, appropriate for a relief valve without variance.

In one exemplary embodiment, for a particular pressure rating the design combination may show a 45° opening in the combination dual valve element 100, and a 22.5° opening in the molded seal 200. This exemplary feature according to the invention provides a constant opening zone for the flow, irrespective of assembly orientation. That is, in any given assembly orientation of the combination element, the molded top cap will have the same fixed area. In one example for one set of relief valve pressure settings, the fixed area may be a 22.5°×4 area that is always available, even if the slots are covered partially by the rubber combination dual valve element 100. According to exemplary embodiments of the invention, the ADB sealing lip 112 opens-up a passage for the inlet when the pump/engine is turned on, to allow flow of fluid, and returns to the closed position when the engine is turned off.

The exemplary combination dual valve element integrating anti-drain back valves with relief valves according to the embodiments of the invention provide a simplified design with efficient flow characteristics. This is obtained in part by placing the combination dual valve element 100 in a slotted end seal 200 having a proportional opening area relationship. The combination dual valve element 100 according to the invention further includes support lugs 102 used to provide for stack-up assembly tolerances and complete sealing of the anti-drain back and relief valves in various operating conditions.

According to exemplary embodiments of the invention, the conventional bottom spring/element guide 19 and the bottom end cap 20 shown in FIG. 5 are eliminated by use of the above described configuration of the molded bottom element support seal 300. The filter element includes a virtually self-contained filtration body 11 of media pleats sealed between themselves. This combination provides better flow properties for lubricants such as oil than is possible with an end-capped filter. The exemplary oil filter element provides minimal resistance to the flow, and provides better flow characteristics than a conventional oil flow filter.

The exemplary embodiments of the present invention, compared to conventional oil filters, reduce the number of components necessary to manufacture the filter from about 6-7 components to only two. These are assembled along with the filter media and related components by interference fit. This also reduces the number and difficulty of the necessary assembly steps.

Figure 4:
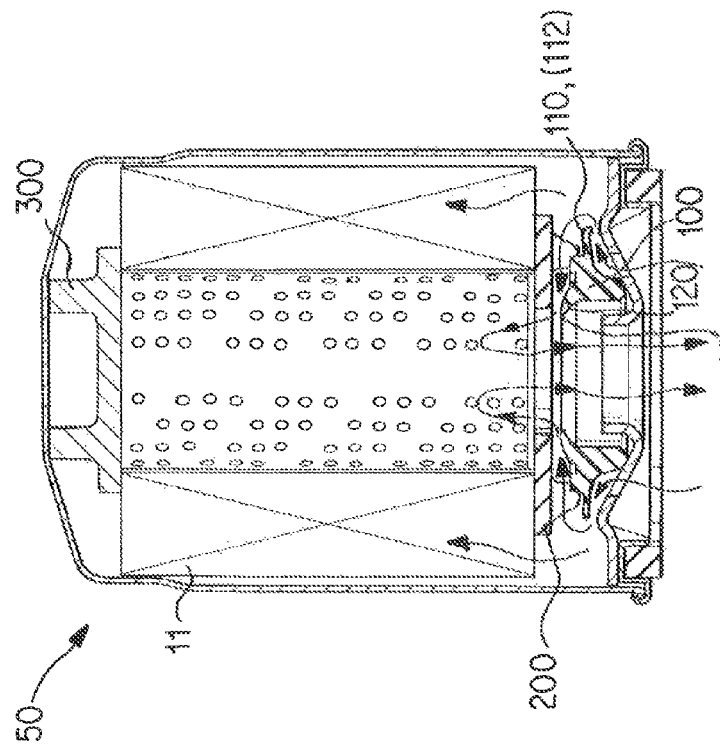
FIG. 4 is a diagram showing the filter with the combination dual valve element of FIG. 1 in a fully restricted flow condition, when the ADB valve is open and the relief valve is fully open.
Figure 3:
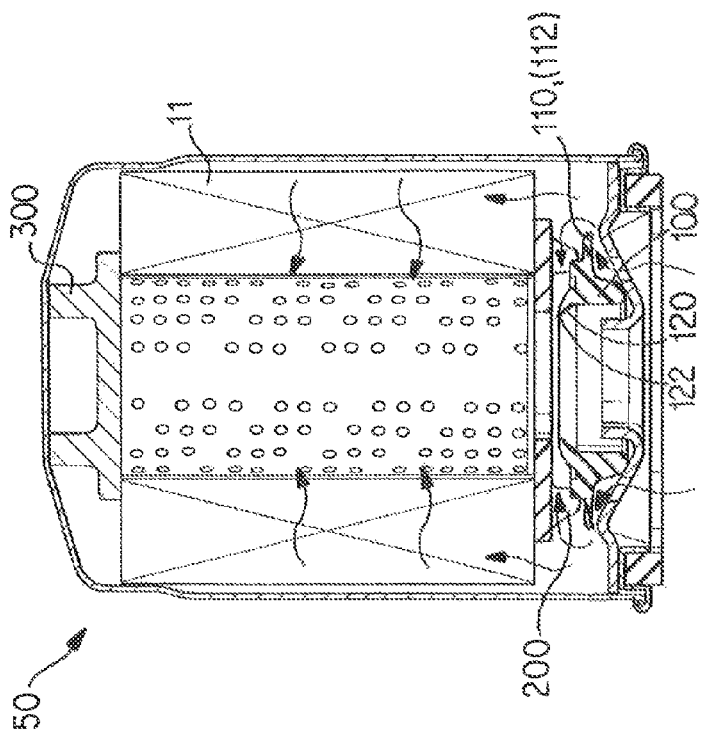
FIG. 3 is a diagram showing the filter with the combination dual valve element of FIG. 1 in a partially restricted flow condition, when the ADB valve is open and the relief valve is partially open.

According to the embodiments of the present invention, when a sufficient set and/or designed pressure differential is reached, the relief valve seal lip 122 gives way and allows the flow of fluid into the central core 9 of the filter 50, which directs the flow bypass for return to the outlet without going through the filter media 11. The relief valve may be required to open under partial or full restriction conditions as is shown in FIG. 3 and FIG. 4. The amount of opening may vary between closed and full open, depending on the pressure differential across the valve due to the flow restriction.

The relief valve lip 122 of the combination dual valve element 100 is designed to seat back and seal the inlet from the outlet under normal conditions. This typically occurs when the pressure of the fluid in the filter, or more precisely the pressure differential across the relief valve component 120 is below a pre-set pressure differential set to correspond to a desired degree of flow restriction in the filter 50.

FIG. 1 to FIG. 4 are referred to for explaining the function of exemplary embodiments according to the invention, of a combination dual valve element integrating an anti-drain back and a relief valve for a fluid filter such as a spin on oil filter. The combination dual valve element 100 incorporates an RV valve portion 120 and an ADB valve portion 110 into a single element, which cooperates with the adjacent seal combination ring 200 to achieve the correct opening pressures and flows of the valves.

In FIG. 1, a no oil flow condition or engine off-pump off condition is shown. In this configuration the dome of the filter is shown in the up position and the thread plate 13 is facing downward. Both relief valve portion 120 and anti-drain back valve portion 110 are closed in this configuration.

FIG. 2 shows a normal oil flow condition when the engine/pump are operating and generate a positive fluid flow. Oil enters in the filter housing 12 through inlets 14 as the anti-drain back valve lip 112 gives way (opens-up) under normal operating pressures of a positive flow through the lubrication system to which the filter is connected, and dirty oil get in the filter housing. The relief valve portion 120 is closed and clean oil comes out of the filter thru the thread hole outlet 15, connected to the threaded stud on the engine's mounting base. Flow curves in the sketch indicate the direction of flow in the filter.

FIG. 3 shows the opening condition of the relief valve portion 120 under partial restriction conditions, and FIG. 4 shows the relief valve lip 122 of the relief valve portion 120 giving way for oil flow by lifting from the RV seal ring 200, under a built-up differential pressure condition.

FIG. 6 shows the spin-on fluid filter according to an embodiment of the present invention, including a combination bottom support-end seal element 300, and the combination dual valve element 100 integrating the anti drain back valve portion 110 with end seal and the relief valve portion 120. FIGS. 8*a-d*, described above, show the 3-D perspective, side and top views of the exemplary combination dual valve element according to the present invention.

Figure 8A:
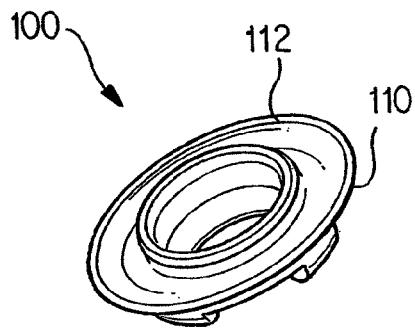
FIGS. 8a-d show perspective and plan views of an exemplary combination dual valve element according to the invention, as incorporated in the exemplary filter shown in FIG. 6.
Figure 8C:
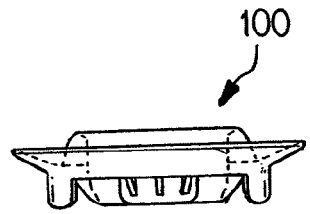
Figure 8B:
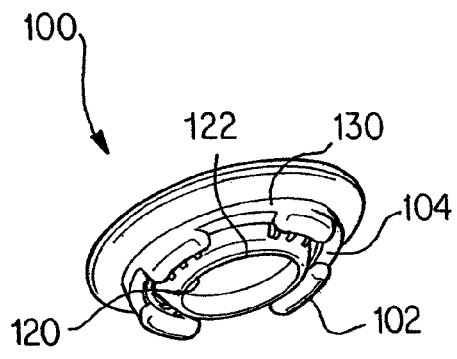
Figure 8D:
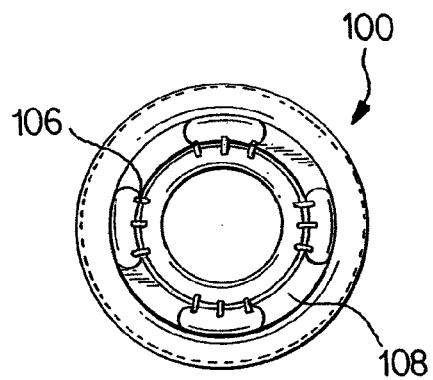
Figure 8E:
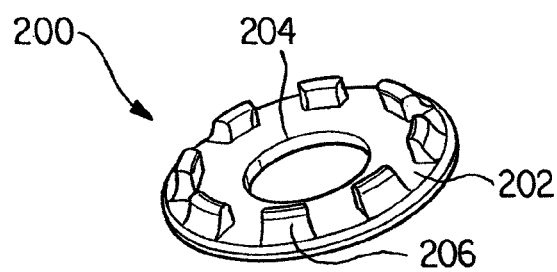
FIG. 8e is a diagram showing an exemplary combination ring/top end element seal.

FIG. 8*e* shows in greater detail the design features of a seal combination ring/end element seal 200 as described above. The seal combination ring 200 cooperates with the combination dual valve element 100 to provide the desired opening pressure differential used to open the valves. The proportional valve openings 202 are formed, for example, between protrusions 206 that are disposed in a circle around the RV seal opening 204.

Figure 9A:
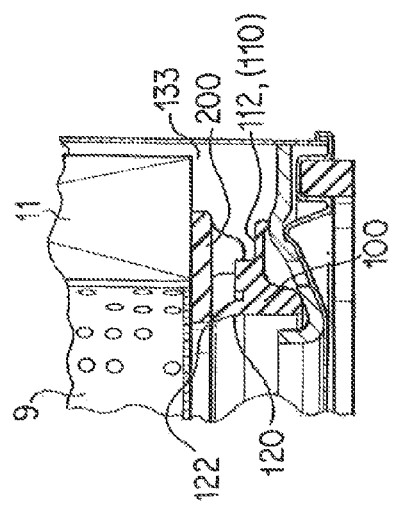
FIGS. 9a-d show detail views of a combination dual valve element respectively in a no flow condition, a normal flow condition, a partially restricted flow condition and a fully restricted flow condition, according to an embodiment of the invention.

FIGS. 9*a-d* show enlarged detail views of the combination dual valve element 100 corresponding to the overall flow conditions depicted in FIGS. 1-4. More specifically, FIG. 9*a* depicts the state of the combination dual valve element 100 in a no flow configuration, obtained for example in a no oil flow condition caused by the engine and/or the fluid pump being off. In this configuration, the relief valve portion 120 and the ADB valve portion 110 are both closed.

Figure 9B:
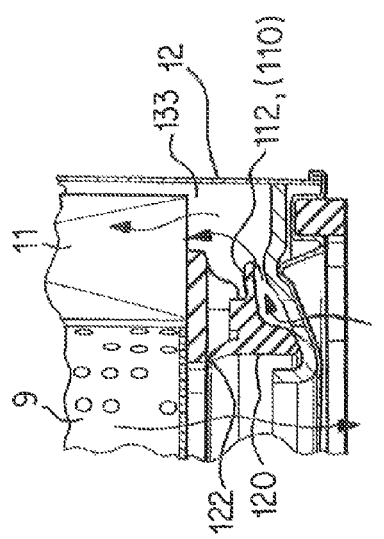

Another configuration is obtained in a normal flow condition, shown in FIG. 9*b*, when the oil flows normally through the filter without restriction. The fluid enters through inlets 14 as the ADB valve lip 112 is open. In this condition, the RV seal lip 122 is closed, to prevent the unfiltered fluid in the cavity 133 from bypassing the filter media pack 11, and entering in the center tube 9 unfiltered. The fluid thus has to pass through the filter media pack 11 before exiting the filter.

Figure 9C:
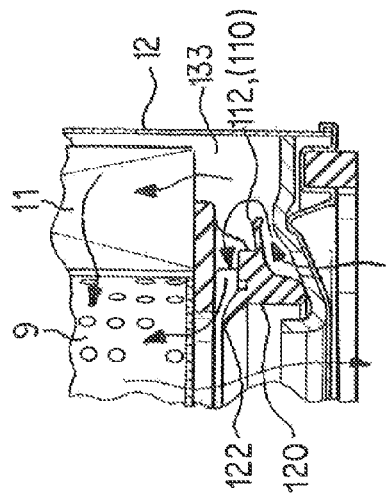

FIG. 9*c* shows a bypass flow condition of the combination dual valve element 100, corresponding to a partial restriction of the filter 50. In this condition, the RV sealing lip 122 begins to open, and a certain amount of unfiltered fluid is permitted to bypass the filter media 11, and to go directly form the cavity 133 to the center tube 9 by way of the bypass valve.

Figure 9D:
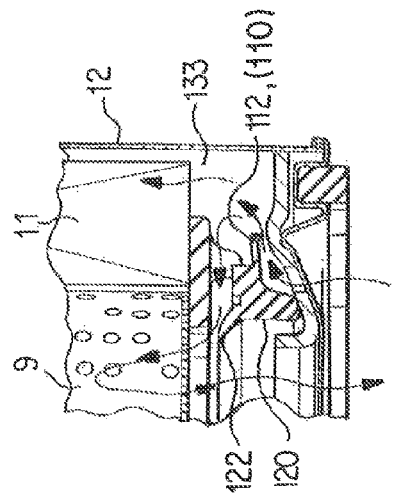

Another bypass flow condition of the combination dual valve element 100 is shown in FIG. 9*d*. In this condition, the flow results from an extremely restricted state of the filter 50, such that a large amount of unfiltered fluid passes directly from the cavity 133 to the center tube 9. Here, the RV sealing lip 122 is completely deflected away from the seal combination ring 200, allowing the fluid to largely bypass the filter media 11. This condition could result, for example, from a severe clogging of the filter media 11, which would cause a large pressure differential across the relief valve portion 120. The RV sealing lip 122 may have different degrees of opening depending on the differential pressure resulting from different amounts of restriction.

In the three latter conditions the ADB valve portion 110 maintains the ADB sealing lip 112 in the open position, to let the fluid enter the filter 50. The ADB sealing lip 112 closes only when there is no pressure in the fluid generated by, for example, and oil pump or other device to motivate the fluid. When the ADB valve portion 110 of the combination dual valve element 100 closes, the fluid in the filter 50 is retained therein, and is immediately available for circulation when the pump is started up again. Holding the fluid in the filter 50 may also help prevent drying and other damage to the filter.

In the above described conditions, the end sealing element 200 cooperates with the combination dual valve element 100 to maintain a seal with the body of the filter 50. As described above, the proportional valve openings 202 of the end sealing element 200 are designed in size and shape to control the opening differential pressure that results in opening of the RV seal lip 122.

The exemplary embodiments of the combination anti-drain back valve relief valve according to the invention, as shown in FIG. 8*a*-8*e*, include the following features:

The combination dual valve element incorporating anti-drain back valve and relief valve features replaces completely a large set of other components and processes, as described above.

The shaped RV opening-flow zones and the shape/design of the support lugs of the combination dual valve element, can be used to support and to control the stacking tolerances of the assembly.

The relief valve sealing lip design features and shapes, are adapted to open and close in the relief valve portion as a result of a selected pressure differential, to perform the function of relief valve in the filter assembly.

Retracting ribs 106, shown in FIG. 8*d*, may be provided to help retract and close the RV sealing lip 122 by bringing it back in contact with the RV seal opening 204 inner diameter when the relief valve is required to be closed.

Proportionately spaced un-ribbed initial opening zones 108, also shown in FIG. 8*d*, maybe provided to help initiate opening of the RV seal lip 122. This proportionally spaced area with no ribs helps to eliminate resistance to opening of the relief valve at the required differential pressure.

Additionally, the seal combination ring 200 according to the embodiments of the present invention includes the features of a sealing lip shape and of proportional valve opening zones 202 that provide sealing between the filter elements, and prevent leakage between the inlet and the outlet of the filter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An end cap for an oil filter, comprising:
   a combination dual valve element defining an integral anti-drain back valve and an integral relief valve;
   a seal combination ring adapted to seal the combination dual valve element into a body of the oil filter, and cooperating with the combination dual valve element to form a relief valve portion thereof;
   an ADB sealing lip of the combination dual valve element, defining an anti-drain back valve portion thereof;
   an RV sealing lip of the combination dual valve element, defining the relief valve portion with the seal combination ring; and
   retracting ribs of the RV sealing lip, for facilitating closure of the relief valve portion below a pre-defined pressure differential threshold, wherein:
   the combination dual valve element further comprises support lugs defining flow zones of the relief valve portion, and
   each of the support lugs corresponds to a plurality of the retracting ribs, such that a respective support lug extends circumferentially beyond circumferential edges of the corresponding plurality of the retracting ribs.

2. The end cap according to claim 1, further comprising proportional valve openings of the seal combination ring providing specified flow areas.

3. The end cap according to claim 1, wherein the flow zones cooperate with proportionate valve openings of the seal combination ring to control an opening pressure differential of the RV sealing lip.

4. The end cap according to claim 1, wherein the seal combination ring and the combination dual valve element are formed of a resilient material.

5. The end cap according to claim 4, wherein the resilient material is a polymeric material.

6. The end cap according to claim 1, wherein the ADB sealing lip opens under normal operating pressure of a positive fluid flow.

7. The end cap according to claim 6, wherein the ADB sealing lip closes when no positive fluid flow is provided to the oil filter.

8. A fluid filter, comprising:
   a combination dual valve element defining an integral anti-drain back valve and an integral relief valve;
   a seal combination ring adapted to seal the combination dual valve element into a body of the fluid filter, and cooperating with the combination dual valve element to form a relief valve portion thereof;
   an ADB sealing lip of the combination dual valve element, defining an anti-drain back valve portion thereof;
   an RV sealing lip of the combination dual valve element, defining the relief valve portion with the seal combination ring;
   retracting ribs of the RV sealing lip, for facilitating closure of the relief valve portion below a pre-defined pressure differential threshold; and
   a retainer assembly for maintaining the seal combination ring in position in an end cap of the fluid filter, wherein:
   the combination dual valve element further comprises support lugs defining flow zones of the relief valve portion, and
   each of the support lugs corresponds to a plurality of the retracting ribs, such that a respective support lug extends circumferentially beyond circumferential edges of the corresponding plurality of the retracting ribs.

9. The fluid filter according to claim 8, further comprising an element support seal disposed in the fluid filter opposite to the seal combination ring, for supporting a filter element.

10. The fluid filter according to claim 8, wherein the flow zones cooperate with proportionate valve openings of the seal combination ring to control an opening pressure differential of the RV sealing lip.

11. A combination dual valve element for a filter, defining an integral anti-drain back valve and an integral relief valve, comprising:
   a relief valve portion having a RV sealing lip openable to direct at least a portion of a fluid to bypass a filter media of the filter, when a pre-selected pressure differential threshold across the relief valve portion is exceeded;
   an anti drain back valve portion having a ADB sealing lip openable when a positive fluid flow is provided therethrough;
   retracting ribs of the RV sealing lip, for facilitating closure of the relief valve portion below the pre-defined pressure differential threshold;
   a sealing ring for sealing the combination dual valve element in a body of the filter; and
   support lugs defining flow zones of the relief valve portion, wherein each of the support lugs corresponds to a plurality of the retracting ribs, such that a respective support lug extends circumferentially beyond circumferential edges of the corresponding plurality of the retracting ribs.

12. The combination dual valve element according to claim 11, further comprising proportionate valve openings of the sealing ring, cooperating with the relief valve portion to control an opening pressure differential thereof.

13. The combination dual valve element according to claim 11, wherein the ADB sealing lip is disposed circumferentially around the relief valve portion.

14. The combination dual valve element according to claim 11, wherein the support lugs support a filter media of the filter.

15. The combination dual valve element according to claim 14, wherein the flow zones cooperate with proportional valve openings of the sealing ring to control an opening pressure differential of the RV sealing lip.

16. The combination dual valve element according to claim 11, wherein the relief valve and the anti drain back portions are formed of a resilient material.

17. The combination dual valve element according to claim 16, wherein the resilient material is a polymer.

* * * * *